(12) United States Patent
Mangold et al.

(10) Patent No.: US 9,361,448 B2
(45) Date of Patent: *Jun. 7, 2016

(54) ENABLING AUTHENTICATION AND/OR EFFECTUATING EVENTS IN VIRTUAL ENVIRONMENTS BASED ON SHAKING PATTERNS AND/OR ENVIRONMENTAL INFORMATION ASSOCIATED WITH REAL-WORLD HANDHELD DEVICES

(71) Applicant: Disney Enterprises, Inc., Burbank, CA (US)

(72) Inventors: Stefan Mangold, Liebefeld (CH); Roman Frigg, Ebmatingen (CH); Thomas R. Gross, Bergheimstrasse (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,213

(22) Filed: Sep. 11, 2014

(65) Prior Publication Data

US 2015/0013004 A1    Jan. 8, 2015

Related U.S. Application Data

(63) Continuation of application No. 13/529,658, filed on Jun. 21, 2012, now Pat. No. 8,854,178.

(51) Int. Cl.
*G05B 19/00* (2006.01)
*G08B 5/22* (2006.01)
(Continued)

(52) U.S. Cl.
CPC .............. *G06F 21/36* (2013.01); *A63F 13/12* (2013.01); *G06T 19/003* (2013.01); *H04W 12/06* (2013.01); *G06T 2200/04* (2013.01)

(58) Field of Classification Search
CPC . G06F 3/007; G06F 9/04; G06F 2203/04808; G06F 2213/3604; G06F 9/00; G06F 15/00; G01C 19/5642; H04L 65/10; H04L 65/1066; A63F 2300/6009; A63F 2300/64; A63F 2300/65; A63F 2300/6623; A63F 2250/28; A63F 2250/30; G06T 15/10; G06T 2200/04; G06T 2219/024; G06T 2219/2016
USPC ......... 340/5.2, 407.1, 407.2, 7.6, 7.61, 815.4, 340/425.5, 691.6; 345/156, 158, 173, 178, 345/419, 653, 664; 463/1, 31, 32, 40, 42
See application file for complete search history.

(56) References Cited

U.S. PATENT DOCUMENTS 7,809,789 B2   10/2010   Shuster ........................ 709/203
8,280,966 B2   10/2012   Steinhauer .................... 709/206
(Continued)

OTHER PUBLICATIONS

Disney Club Penguin, http://www.clubpenguin.com/, screenshot printed May 25, 2012.
(Continued)

*Primary Examiner* — Mirza Alam
(74) *Attorney, Agent, or Firm* — Sheppard Mullin Richter & Hampton LLP (57) ABSTRACT

Shaking patterns and/or environmental information associated with real-world handheld devices may form a basis for enabling authentication and/or effectuating events in a virtual environment. The handheld devices may include toys and/or other object that can be used to play. The handheld devices may be associated with the virtual environment in that individual handheld devices may share an appearance and/or theme with an avatar, a virtual object, and/or other element within the virtual environment. Shaking a pair of handheld devices together may facilitate authentication of the handheld devices with respect to the virtual environment and/or effectuate one or more events within the virtual environment. Shake patterns may be used in conjunction with geo-location and/or environmental information to improve pairing between handheld devices.

20 Claims, 2 Drawing Sheets

(51) Int. Cl.

| | | |
|---|---|---|
| *H04B 3/36* | (2006.01) | |
| *G08B 5/00* | (2006.01) | |
| *G06F 3/048* | (2013.01) | |
| *G06F 3/00* | (2006.01) | |
| *G06T 15/00* | (2011.01) | |
| *G06T 13/00* | (2011.01) | |
| *G09G 5/00* | (2006.01) | |
| *A63F 9/24* | (2006.01) | |
| *G06F 21/36* | (2013.01) | |
| *A63F 13/30* | (2014.01) | |
| *G06T 19/00* | (2011.01) | |
| *H04W 12/06* | (2009.01) | |

(56) References Cited

U.S. PATENT DOCUMENTS

| | | | |
|---|---|---|---|
| 8,522,330 B2* | 8/2013 | Shuster | G06T 19/20 715/757 |
| 2004/0263494 A1 | 12/2004 | Poor | |
| 2006/0256074 A1 | 11/2006 | Krum | |
| 2007/0005835 A1* | 1/2007 | Grant | G06F 3/016 710/62 |
| 2010/0070859 A1* | 3/2010 | Shuster | A63F 13/12 715/706 |
| 2010/0076970 A1 | 3/2010 | Bates et al. | 707/736 |
| 2010/0164946 A1* | 7/2010 | Hyndman | G06T 13/40 345/419 |
| 2012/0130717 A1* | 5/2012 | Xu | G06T 13/40 704/258 |
| 2012/0290950 A1* | 11/2012 | Rapaport | H04L 51/32 715/753 |
| 2014/0273849 A1 | 9/2014 | Lee | |
| 2015/0009116 A1 | 1/2015 | Mangold | |

OTHER PUBLICATIONS

Disney Pixie Hollow and Clickables, http://www.wonderlandblog.com/wonderland/2008/03/disneys-pixie-h.html., accessed Jul. 13, 2011, online blog article, screenshot printed May 25, 2012.

Disney Pixie Hollow, http://pixiehollow.go.com/, screenshot printed May 23, 2012.

DJNative Swing Java Library, http://djproject.sourceforge.net/ns/index.html, accessed Jul. 19, 2011, screenshots printed May 25, 2012.

Frigg, Roman (2011) "Design and Evaluation of Authentication Mechanisms for Networked Toys based on Shaking Patterns" (DRAFT 0.1), Bachelors Thesis, Jul. 2011, ETH Zurich.

Kumar, Arun et al. (2009) "A comparative study of secure device pairing methods", Pervasive Mob. Comput. 5, 6 (Dec. 2009), 734-749, DOI=10.1016/j.pmcj.2009.07.008.

Mayrhofer, R. et al., (2009) "Shake Well Before Use: Intuitive and Secure Pairing of Mobile Devices." IEEE Trans on Mob. Comput., vol. 8, No. 6, pp. 792-806, 2009.

Mayrhofer, R. et al., Shake well before use: authentication based on accelerometer data. *Pervasive Computing*, pp. 144-161, 2007.

Schmid, Stefan et al., Networking Smart Toys with Wireless ToyBridge and ToyTalk. In *Poster Session, INfocom* 2011, 2011.

Asadzadeh et al., "Real-time Gesture Recognition Using RFID Technology" 5th international Workshop on Pervasive Advertising (PerAd5) Jun. 2012 (10 pages).

\* cited by examiner

ENABLING AUTHENTICATION AND/OR EFFECTUATING EVENTS IN VIRTUAL ENVIRONMENTS BASED ON SHAKING PATTERNS AND/OR ENVIRONMENTAL INFORMATION ASSOCIATED WITH REAL-WORLD HANDHELD DEVICES

CROSS REFERENCE TO RELATED APPLICATIONS

This application is a continuation of U.S. patent application Ser. No. 13/529,658, filed Jun. 21, 2012, entitled "Enabling Authentication And/Or Effectuating Events In Virtual Environments Based On Shaking Patterns And/Or Environmental Information Associated With Real-World Handheld Devices", the entirety of which is incorporated herein by reference.

FIELD OF THE DISCLOSURE

This disclosure relates to enabling authentication and/or effectuating events in virtual environments based on shaking patterns and/or environmental information associated with real-world handheld devices.

BACKGROUND

Pairing devices based on shared shake patterns in known. Typically, however, existing approaches merely enable communication between two devices. For example, a mobile phone and a wireless headset may be shaken together so that they each record similar shake patterns, which may then be used to pair the devices to enable communication there between.

SUMMARY

One aspect of the disclosure relates to a system configured to enable authentication and/or effectuate events in a virtual environment based on shaking patterns and/or environmental information associated with real-world handheld devices, in accordance with one or more implementations. In exemplary implementations, the handheld devices may include toys and/or other object that can be used to play. The handheld devices may be associated with a virtual environment in that individual handheld devices may share an appearance and/or theme with an avatar, a virtual object, and/or other element within the virtual environment. Shaking a pair of handheld devices together may facilitate authentication of the handheld devices with respect to the virtual environment and/or effectuate one or more events within the virtual environment. By way of non-limiting example, two avatars may dance together or become friends in the virtual environment responsive to two corresponding handheld devices being shaken together. As another non-limiting example, an avatar may obtain a virtual sword or other accessory in the virtual environment responsive to a handheld device representing the avatar being shaken together with a second handheld device representing the virtual sword or other accessory. In some implementations, shake patterns may be used in conjunction with geo-location and/or environmental information to improve pairing between handheld devices. For example, information associated with ambient light and/or sound conditions may be used with shake patterns to improve matching.

In some implementations, the system may include one or more handheld devices. The handheld device(s) may be configured to communicate with one or more servers, either directly or via one or more client computing devices, according to a client/server architecture. Users may access the system and/or the virtual environment via the client computing platform(s). In some implementations, there may be no direct communication between individual handheld devices.

The handheld device(s) may include one or more of motion detection apparatus, geo-location apparatus, one or more environmental sensors, and/or other components. The motion detection apparatus may be configured to generate a shake signal conveying information associated with a shaking motion of the handheld device(s). The geo-location apparatus may be configured to generate a geo-location signal conveying Information associated with a geo-location of the handheld device(s). The environmental sensor(s) may be configured to generate one or more environmental signals conveying information associated with an environment or surroundings of the handheld device(s).

The handheld device(s) may be configured to execute one or more computer program modules. The computer program modules may include one or more of a shake pattern module, a geo-location module, an environmental information module, and/or other modules.

The shake pattern module may be configured to receive a shake signal conveying information associated with a shaking motion of a given handheld device. The shake signal may be received from generated by motion detection apparatus carried by the given handheld device. In some implementations, the information associated with the shaking motion of the given handheld device may include a shake pattern. A shake pattern may describe linear translations of handheld device(s) as a function of time.

A shake pattern may be configured to be interpreted as a unique encryption key associated with a given handheld device. The encryption key may be stored within electronic storage (described further herein) carried by individual handheld device(s). The encryption key may be configured to enable authentication and/or facilitate managing relationships within the virtual environment. According to some implementations, the given handheld device may automatically upload the encryption key and/or other information responsive to connecting with the system and/or the virtual environment.

The geo-location module may be configured to receive a geo-location signal conveying information associated with a geo-location of a given handheld device. The geo-location signal may be receive from the geo-location apparatus carried by the given handheld device. In some implementations, the information associated with a geo-location of the given handheld device may relate to a longitude and a latitude of the given handheld device.

The environmental information module may be configured to receive one or more environmental signals conveying information associated with an environment of a given handheld device. The one or more environmental signals may be received from one or more environmental sensors carried by the given handheld device. By way of non-limiting example, the one or more environmental sensors may include one or more of an acoustic sensor, an optical sensor, and/or other sensors. As such, the information associated with the environment of the given handheld device may include one or more of acoustic information optical information, and/or other information associated with the environment or surroundings of the given handheld device.

The server(s) may be configured to execute one or more computer program modules. The computer program modules may include one or more of a user module, an environment module, an authentication module, a device matching module, a relationship module, and/or other modules. The user module may be configured to access and/or manage one or more user profiles and/or user information associated with users of system. The environment module may be configured to provide one or more virtual environments to users via the client computing platform(s). As used herein, a "virtual environment" may include a virtual space, one or more interactive, electronic social media, and/or other virtual environments.

The authentication module may be configured to authenticate handheld devices with respect to the virtual environment based on information associated with a shaking motion of individual handheld device(s). Authenticating a given handheld may include enabling a user login in the virtual environment, matching an avatar and/or virtual object In the virtual environment with a given handheld device, establishing a relationship between users in the virtual environment, providing and/or implementing parental controls, and/or other actions associated with virtual environment authentication.

In some implementations, the information associated with the shaking motion of a given handheld device may include a shake pattern configured to be interpreted as a unique encryption key associated with the given handheld device. The encryption key may be configured to enable authentication and/or facilitate managing relationships within the virtual environment. According to some implementations, the encryption key and/or other information may be automatically received by the authentication module responsive to the given handheld device(s) connecting with the system and/or the virtual environment.

The device matching module may be configured to determine whether two or more handheld devices have been shaken together. This determination may be based on one or more of (1) information associated with respective shaking motions associated with the handheld devices, (2) geo-location information respectively associated with the handheld devices (3) environmental information respectively associated with the handheld devices, and/or other information associated with the handheld devices.

An action within the virtual environment may be triggered responsive to a positive determination that the two or more handheld devices were shaken together (e.g., by the environment module). By way of non-limiting example, the action may include an interaction in the virtual environment between a first avatar associated with a first handheld device and a second avatar associated with a second handheld device. As another example, the action may include a first virtual object associated with a first handheld device being obtained in the virtual environment by a second avatar associated with a second handheld device.

According to some implementations, the device matching module may include a shake pattern correlation sub-module. The shake pattern correlation sub-module may be configured to determine whether two or more handheld devices have been shaken together by correlating the information associated with respective shaking motions associated with the handheld devices.

In some implementations including a first handheld device and a second handheld device, the information associated with respective shaking motions associated with the first and second handheld devices may include a first shake pattern and a second shake pattern. The first and second shake patterns may each including a range of frequencies. The device matching module may be configured to extract frequency bands from the first and second shake patterns that correspond to typical shaking movements.

In some implementations, the shake pattern correlation sub-module may be configured to (1) divide the first and second shake patterns into a plurality of overlapping segments, (2) determine maximum absolute values of a cross-correlation for individual pairs of corresponding segments, and (3) determine a similarity measure between the first and second shake patterns as the mean of the maximum absolute values of the cross-correlation for individual pairs of corresponding segments. The similarity measure may be used to match the first and second handheld devices.

The device matching module may include a geo-location correlation sub-module. The gee-location correlation sub-module may be configured to determine whether the first handheld device and the second handheld device have been shaken together by correlating the geo-location respectively associated with the first and second handheld devices. Correlating geo-locations may include determining whether two geo-locations are proximal to each other.

The device matching module may include an environmental information correlation sub-module. The environmental information correlation sub-module may be configured to determine whether the first handheld device and the second handheld device have been shaken together by correlating the environmental information respectively associated with the first and second handheld devices. Correlating environmental information may include determining whether ambient lighting conditions, ambient acoustic conditions, and/or other environmental conditions are sufficiently similar to conclude that the first handheld device and the second handheld device have been shaken together.

The relationship module may be configured to establish and/or manage relationships between users and/or user characters (e.g., avatars) within the virtual environment. In some implementations, a relationship between a first avatar associated with a first handheld device and a second avatar associated with a second handheld device may be established in the virtual environment responsive to a positive determination that the first handheld device and the second handheld device were shaken together. Such relationships may include one or more of friendships, guilds (with guild-mates), alliances, connections, followers, and/or other relationships. The relationship module may establish relationships based on relationship requests and acceptances received from users. Relationships may include one or more types of relationships that have a functional purpose or impact within the virtual environment, and/or one or more types of relationships that a social construct within the virtual environment that does not have a functional result.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an" and "the" include plural referents unless the context clearly dictates otherwise.

DETAILED DESCRIPTION

Figure 1:
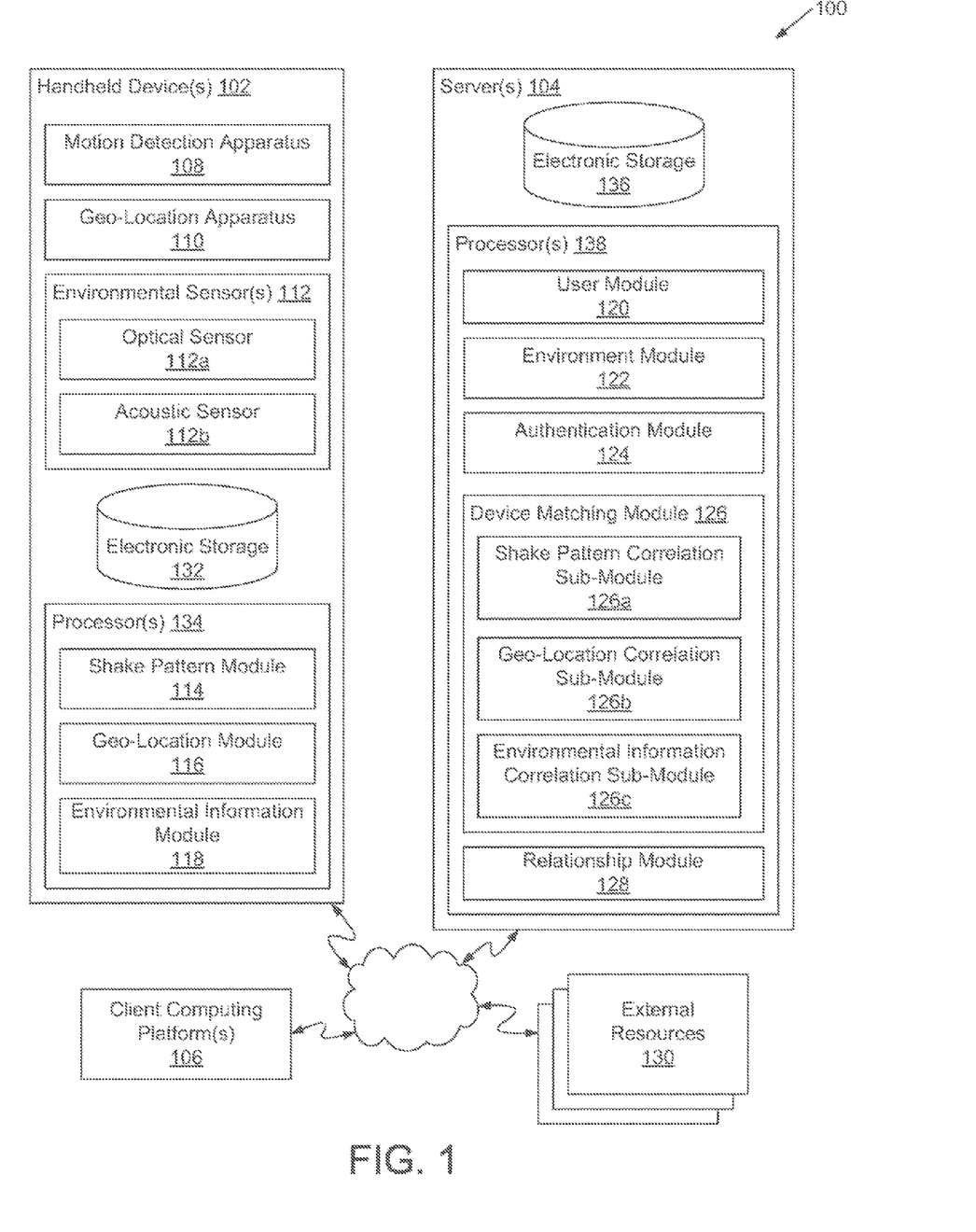
FIG. 1 illustrates a system configured to enable authentication and/or effectuate events in a virtual environment based on shaking patterns and/or environmental information associated with real-world handheld devices, in accordance with one or more implementations.

FIG. 1 illustrates a system 100 configured to enable authentication and/or effectuate events in a virtual environment based on shaking patterns and/or environmental information associated with real-world handheld devices, in accordance with one or more implementations. In exemplary implementations, the handheld devices may include toys and/or other object that can be used to play. The handheld devices may be associated with a virtual environment in that individual handheld devices may share an appearance and/or theme with an avatar, a virtual object, and/or other element within the virtual environment. Shaking a pair of handheld devices together may facilitate authentication of the handheld devices with respect to the virtual environment and/or effectuate one or more events within the virtual environment. By way of non-limiting example, two avatars may dance together or become friends in the virtual environment responsive to two corresponding handheld devices being shaken together. As another non-limiting example, an avatar may obtain a virtual sword or other accessory in the virtual environment responsive to a handheld device representing the avatar being shaken together with a second handheld device representing the virtual sword or other accessory. In some implementations, shake patterns may be used in conjunction with geo-location and/or environmental information to improve pairing between handheld devices. For example, information associated with ambient light and/or sound conditions may be used with shake patterns to improve matching.

In some implementations, system 100 may include one or more handheld devices 102. The handheld device(s) 102 may be configured to communicate with one or more servers 104, either directly or via one or more client computing devices 106, according to a client/server architecture. Users may access system 100 and/or the virtual environment via client computing platform(s) 106. In some implementations, there may be no direct communication between individual handheld devices 102. The handheld device(s) 102 may include one or more of motion detection apparatus 108, geo-location apparatus 110, one or more environmental sensors 112, and/or other components.

The motion detection apparatus 108 may include an accelerometer, a gyroscope, a pedometer, and/or other apparatuses configured to facilitate detecting motion. The motion detection apparatus 108 may be configured to generate a shake signal conveying information associated with a shaking motion of handheld device(s) 102. In some implementations, the information associated with a shaking motion of handheld device(s) 102 may relate to or describe linear translations of handheld device(s) 102 as a function of time.

The geo-location apparatus 110 may include global positioning system (GPS) device, and/or other apparatuses configured to facilitate determining geo-locations. The geo-location apparatus 110 may be configured to generate a geo-location signal conveying information associated with a geo-location of handheld device(s) 102. In some implementations, the information associated with a geo-location of handheld device(s) 102 may relate to a longitude and a latitude of handheld device(s) 102.

The environmental sensor(s) 112 may include one or more sensors. The environmental sensor(s) 112 may be configured to generate one or more environmental signals conveying information associated with an environment or surroundings of handheld device(s) 102. In some implementations, environmental sensor(s) 112 may include one or more of an optical sensor 112a, an acoustic sensor 112b, and/or other sensors.

The optical sensor 112a may include one or more of a camera, a photodiode, a phototransistor, a light emitting diode (LED), and/or other optical sensors. The optical sensor 112a may be configured to generate an optical signal conveying information associated with ambient lighting conditions of an environment of handheld device(s) 102.

The acoustic sensor 112b may include one or more of a microphone, an acoustic-to-electric transducer, a loudspeaker, and/or other acoustic sensors. The acoustic sensor 112b may be configured to generate an acoustic signal conveying information associated with ambient acoustic conditions of an environment of handheld device(s) 102.

The depiction of handheld device(s) 102 in FIG. 1 is not intended to be limiting as handheld device(s) 102 may include one or more other devices and/or apparatuses not depicted in FIG. 1. For example, in some implementations, handheld device(s) 102 may include a local time apparatus (e.g., a dock) configured to generate a time signal conveying information associated with the local time associated with handheld device(s) 102. As another example, handheld device(s) 102 may include radio detection apparatus configured to generate a radio signal conveying information associated with one or more broadcast radio signals (e.g., television signals, radio beacons, and/or other radio signals) that are detectable in the vicinity of handheld device(s) 102. As yet another example, handheld device(s) 102 may include a wireless network detection apparatus configured to generate a network signal conveying information associated with one or more wireless networks (e.g., Wi-Fi hotspot, cellular network, Bluetooth or Zigbee stations, and/or other wireless network) that are detectable in the vicinity of handheld device(s) 102. As still another example, according to some implementations, handheld device(s) 102 may includes temperature apparatus (e.g., a thermometer or a thermocouple) configured to generate a temperature signal conveying information associated with a temperature of an environment of handheld device(s) 102.

The handheld device(s) 102 may be configured to execute one or more computer program modules. The computer program modules may include one or more of a shake pattern module 114, a geo-location module 116, an environmental information module 118, and/or other modules, The shake pattern module 114 may be configured to receive a shake signal conveying information associated with a shaking motion of a given handheld device 102. The shake signal may be received from generated by motion detection apparatus 108 carried by the given handheld device 102. In some implementations, the information associated with the shaking motion of the given handheld device 102 may include a shake pattern. A shake pattern may describe linear translations of handheld device(s) 102 as a function of time.

A shake pattern may be configured to be interpreted as a unique encryption key associated with a given handheld device 102. The encryption key may be stored within electronic storage (described further herein) carried by individual handheld device(s) 102. The encryption key may be configured to enable authentication and/or facilitate managing relationships within the virtual environment. According to some implementations, the given handheld device 102 may automatically upload the encryption key and/or other information responsive to connecting with system 100 and/or the virtual environment.

The geo-location module 116 may be configured to receive a geo-location signal conveying information associated with a geo-location of a given handheld device 102. The geo-location signal may be receive from geo-location apparatus 110 carried by the given handheld device 102. In some implementations, the information associated with a gee-location of the given handheld device 102 may relate to a longitude and a latitude of the given handheld device 102. According to some implementations, geo-location module 116 may be configured to infer a gee-location of a given handheld device 102 based on information associated with one or more broadcast radio signals that are detectable in the vicinity of the given handheld device 102, information associated with one or more wireless networks that are detectable in the vicinity of the given handheld device 102, and/or other information that can form a basis for inferring geo-location.

The environmental information module 118 may be configured to receive one or more environmental signals conveying information associated with an environment of a given handheld device 102. The one or more environmental signals may be received from one or more environmental sensors carried by the given handheld device 102. By way of non-limiting example, the one or more environmental sensors may include one or more of an acoustic sensor, an optical sensor, and/or other sensors. As such, the information associated with the environment of the given handheld device 102 may include one or more of acoustic information, optical information, and/or other information associated with the environment or surroundings of the given handheld device 102.

The server(s) 104 may be configured to execute one or more computer program modules. The computer program modules may include one or more of a user module 120, an environment module 122, an authentication module 124, a device matching module 126, a relationship module 128, and/or other modules.

The user module 120 may be configured to access and/or manage one or more user profiles and/or user information associated with users of system 100. The one or more user profiles and/or user information may include information stored by server(s) 104, client computing platform(s) 106, and/or other storage locations. The user profiles may include, for example, information identifying users (e.g., a username or handle, a number, an identifier, and/or other identifying information) within the virtual environment, security login information (e.g., a login code or password), virtual environment account information, subscription information, virtual currency account information (e.g., related to currency held in credit for a user), relationship information (e.g., information related to relationships between users in the virtual environment), virtual environment usage information, demographic information associated with users, interaction history among users in the virtual environment, information stated by users, purchase information of users, browsing history of users, one or more handheld device identifications associated with a user, a client computing platform identification associated with a user, a phone number associated with a user, and/or other information related to users.

The environment module 122 may be configured to provide one or more virtual environments to users via client computing platform(s) 106. As used herein, a "virtual environment" may include a virtual space, one or more interactive, electronic social media, and/or other virtual environments, A virtual space may comprise a simulated space that is accessible by users via clients (e.g. client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by environment module 122 is not intended to be limiting. The environment module 122 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic bathe graphic with a textual description of the opponents to be confronted. Other expressions of individual places within the virtual space are contemplated.

Within the instance(s) of the virtual space executed by environment module 122, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 106. The users may interact with each other through communications exchanged within the virtual space. Such communications may include one or more of textual chat, instant messages, private messages, voice communications, and/or other communications. Communications may be received and entered by the users via their respective client computing platform(s)

106. Communications may be routed to and from the appropriate users through server(s) 104 (e.g., through environment module 122).

Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The authentication module 124 may be configured to authenticate handheld devices with respect to the virtual environment based on information associated with a shaking motion of individual handheld device(s) 102. Authenticating a given handheld may include enabling a user login in the virtual environment, matching an avatar and/or virtual object in the virtual environment with a given handheld device 102, establishing a relationship between users in the virtual environment, providing and/or implementing parental controls, and/or other actions associated with virtual environment authentication.

In some implementations, the information associated with the shaking motion of a given handheld device 102 may include a shake pattern configured to be interpreted as a unique encryption key associated with the given handheld device 102. The encryption key may be configured to enable authentication and/or facilitate managing relationships within the virtual environment. According to some implementations, the encryption key and/or other information may be automatically received by authentication module 124 responsive to the given handheld device(s) 102 connecting with system 100 and/or the virtual environment.

The device matching module 126 may be configured to determine whether two or more handheld devices 102 have been shaken together. This determination may be based on one or more of (1) information associated with respective shaking motions associated with the handheld devices 102, (2) geo-location information respectively associated with the handheld devices 102, (3) environmental information respectively associated with the handheld devices 102, and/or other information associated with the handheld devices 102.

An action within the virtual environment may be triggered responsive to a positive determination that the two or more handheld devices 102 were shaken together (e.g., by environment module 122). By way of non-limiting example, the action may include an interaction in the virtual environment between a first avatar associated with a first handheld device and a second avatar associated with a second handheld device. As another example, the action may include a first virtual object associated with a first handheld device being obtained in the virtual environment by a second avatar associated with a second handheld device.

According to some implementations, device matching module 126 may include a shake pattern correlation sub-module 126a. The shake pattern correlation sub-module 126a may be configured to determine whether two or more handheld devices 102 have been shaken together by correlating the information associated with respective shaking motions associated with the handheld devices 102.

In some implementations including a first handheld device 102 and a second handheld device 102, the information associated with respective shaking motions associated with the first and second handheld devices 102 may include a first shake pattern and a second shake pattern. The first and second shake patterns may each including a range of frequencies. The device matching module 126 may be configured to extract frequency bands from the first and second shake patterns that correspond to typical shaking movements. Examples of frequencies corresponding to typical shaking movements may include 2-10 Hz.

In some implementations, shake pattern correlation sub-module 126a may be configured to (1) divide the first and second shake patterns into a plurality of overlapping segments, (2) determine maximum absolute values of a cross-correlation for individual pairs of corresponding segments, and (3) determine a similarity measure between the first and second shake patterns as the mean of the maximum absolute values of the cross-correlation for individual pairs of corresponding segments. The similarity measure may be used to match the first and second handheld device 102.

The device matching module 126 may include a geo-location correlation sub-module 126b. The geo-location correlation sub-module 126b may be configured to determine whether the first handheld device 102 and the second handheld device 102 have been shaken together by correlating the geo-location respectively associated with the first and second handheld devices 102. Correlating geo-locations may include determining whether two geo-locations are proximal to each other. According to some implementations, geo-location correlation sub-module 126b may be configured to determine whether the first handheld device 102 and the second handheld device 102 have been shaken together by correlating information associated with one or more broadcast radio signals that are/were detectable in the vicinity of the first handheld device 102 and/or the second handheld device 102, information associated with one or more wireless networks that are/were detectable in the vicinity of the first handheld device 102 and/or the second handheld device 102, and/or other information that an form a basis for inferring geo-location.

The device matching module 126 may include an environmental information correlation sub-module 126c. The environmental information correlation sub-module 126c may be configured to determine whether the first handheld device 102 and the second handheld device 102 have been shaken together by correlating the environmental information respectively associated with the first and second handheld devices 102. Correlating environmental information may include determining whether ambient lighting conditions, ambient acoustic conditions, and/or other environmental conditions are sufficiently similar to conclude that the first handheld device 102 and the second handheld device 102 have been shaken together.

The relationship module 128 may be configured to establish and/or manage relationships between users and/or user characters (e.g., avatars) within the virtual environment. In some implementations, a relationship between a first avatar associated with a first handheld device 102 and a second avatar associated with a second handheld device 102 may be established in the virtual environment responsive to a positive determination that the first handheld device 102 and the second handheld device 102 were shaken together. Such relationships may include one or more of friendships, guilds (with guild-mates), alliances, connections, followers, and/or other relationships. The relationship module 128 may establish relationships based on relationship requests and acceptances received from users. Relationships may include one or more types of relationships that have a functional purpose or impact within the virtual environment, and/or one or more types of relationships that a social construct within the virtual environment that does not have a functional result.

In some implementations, handheld device(s) 102, server(s) 104, client computing platform(s) 106, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which handheld device(s) 102, server(s) 104, client computing platform(s) 106, and/or external resources 130 may be operatively linked via some other communication media.

A given client computing platform 106 may include one or more processors configured to execute computer program modules. The computer program modules may be configured to enable an expert or user associated with the given client computing platform 106 to interface with system 100 and/or external resources 130, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 130 may include sources of information, hosts and/or providers of virtual environments outside of system 100, external entities participating with system 100, and/or other resources. In some implementations, some or all of the functionality attributed herein to external resources 130 may be provided by resources included in system 100.

The handheld device(s) 102 may include electronic storage 132, one or more processors 134, and/or other components. The handheld device(s) 102 may include communication lines, or ports to enable the exchange of information with a network and/or other computing platforms. Illustration of handheld device(s) 102 in FIG. 1 is not intended to be limiting. The handheld device(s) 102 may include a plurality of hardware, software, and/or firmware components operating together to provide the functionality attributed herein to handheld device(s) 102.

Electronic storage 132 may comprise electronic storage media that electronically stores information. The electronic storage media of electronic storage 132 may include one or both of system storage that is provided integrally (i.e., substantially non-removable) with handheld device(s) 102 and/or removable storage that is removably connectable to handheld device(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 132 may include one or more virtual storage resources (e.g., cloud storage, a virtual private network, and/or other virtual storage resources). Electronic storage 132 may store software algorithms, information determined by processor(s) 134, information received from handheld device(s) 102, information received from server(s) 104, information received from client computing platform(s) 106, and/or other information that enables handheld device(s) 102 to function as described herein.

Processor(s) 134 is configured to provide information processing capabilities in handheld device(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. The processor(s) 134 may be configured to execute modules 114, 116, 118, and/or other modules. The processor(s) 134 may be configured to execute modules 114, 116, 118, and/or other modules by software; hardware; firmware; some combination of software, hardware, and/or firmware; and/or other mechanisms for configuring processing capabilities on processor(s) 134.

It should be appreciated that although modules 114, 116, and 118 are illustrated in FIG. 1 as being co-located within a single processing unit, in implementations in which processor(s) 134 includes multiple processing units, one or more of modules 114, 116, and/or 118 may be located remotely from the other modules. The description of the functionality provided by the different modules 114, 116, and/or 118 described herein is for illustrative purposes, and is not intended to be limiting, as any of modules 114, 116, and/or 118 may provide more or less functionality than is described. For example, one or more of modules 114, 116, and/or 118 may be eliminated, and some or all of its functionality may be provided by other ones of modules 114, 116, and/or 118, and/or other modules described herein. As another example, processor(s) 134 may be configured to execute one or more additional modules that may perform some or all of the functionality attributed below to one of modules 114, 116, and/or 118, and/or other modules described herein.

The server(s) 104 may include electronic storage 136, one or more processors 138, and/or other components. The server(s) 104 may include communication lines, or ports to enable the exchange of information with a network and/or other computing platforms. Illustration of server(s) 104 in FIG. 1 is not intended to be limiting. The server(s) 104 may include a plurality of hardware, software, and/or firmware components operating together to provide the functionality attributed herein to server(s) 104. For example, server(s) 104 may be implemented by a cloud of computing platforms operating together as server(s) 104.

Electronic storage 136 may comprise electronic storage media that electronically stores information. The electronic storage media of electronic storage 136 may include one or both of system storage that is provided integrally (i.e., substantially non-removable) with server(s) 104 and/or removable storage that is removably connectable to server(s) 104 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 136 may include one or more virtual storage resources (e.g., cloud storage, a virtual private network, and/ or other virtual storage resources). Electronic storage 136 may store software algorithms, information determined by processor(s) 138, information received from handheld device(s) 102, information received from server(s) 104, information received from client computing platform(s) 106 and/or other information that enables server(s) 104 to function as described herein.

Processor(s) 138 is configured to provide information processing capabilities in server(s) 104. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some Implementations, processor(s) 138 may include a plurality of processing units. These processing units may be physically located within the same device, or processor(s) 138 may represent processing functionality of a plurality of devices operating in coordination. The processor(s) 138 may be configured to execute modules 120, 122, 124, 126, 128, and/or other modules. The processor(s) 138 may be configured to execute modules 120, 122, 124, 126, 128, and/or other modules by software; hardware; firmware; some combination of software, hardware, and/or firmware; and/or other mechanisms for configuring processing capabilities on processor(s) 138.

It should be appreciated that although modules 120, 122, 124, 126, and 128 are illustrated in FIG. 1 as being co-located within a single processing unit, in implementations in which processor(s) 138 includes multiple processing units, one or more of modules 120, 122, 124, 126, and/or 128 may be located remotely from the other modules. The description of the functionality provided by the different modules 120, 122, 124, 126, and/or 128 described herein is for illustrative purposes, and is not intended to be limiting, as any of modules 120, 122, 124, 126, and/or 128 may provide more or less functionality than is described. For example, one or more of modules 120, 122, 124, 126, and/or 128 may be eliminated, and some or all of its functionality may be provided by other ones of modules 120, 122, 124, 126, and/or 128, and/or other modules described herein. As another example, processor xx may be configured to execute one or more additional modules that may perform some or all of the functionality attributed below to one of modules 120, 122, 124, 126, and/or 128, and/or other modules described herein.

Figure 2:
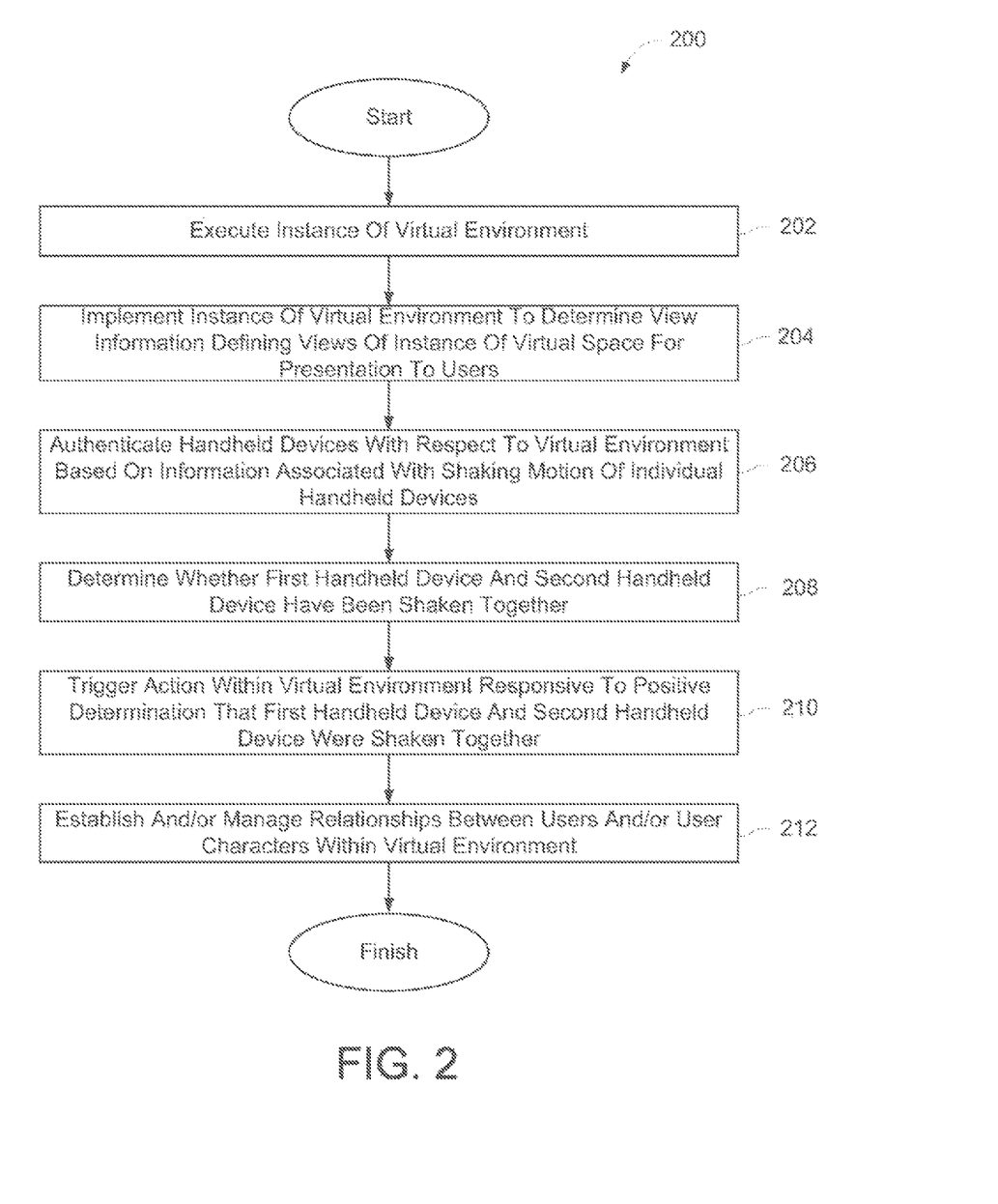
FIG. 2 illustrates a method for enabling authentication and/or effectuate events in a virtual environment based on shaking patterns and/or environmental information associated with real-world handheld devices, in accordance with one or more implementations.

FIG. 2 illustrates a method 200 for enabling authentication and/or effectuate events in a virtual environment based on shaking patterns and/or environmental information associated with real world handheld devices, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a virtual environment may be executed. Operation 202 may be performed by an environment module that is the same as or similar to environment module 122, in accordance with one or more implementations.

At an operation 204, the instance of the virtual environment may be implemented to determine view information defining views of the instance of the virtual environment for presentation to users. The views of the virtual environment may be presented via client computing platform(s) 106. Operation 204 may be performed by an environment module that is the same as or similar to environment module 122, in accordance with one or more implementations, At an operation 206, handheld devices (e.g., handheld device(s) 102) including a first handheld device may be authenticated with respect to the virtual environment based on information associated with a shaking motion of individual handheld devices. The virtual environment may include a first avatar or first virtual object associated with the first handheld device. Operation 206 may be performed by an authentication module that is the same as or similar to authentication module 124, in accordance with one or more implementations.

At an operation 208, a determination may be performed as to whether the first handheld device and a second handheld device have been shaken together. The determination may be based on one or more of (1) information associated with respective shaking motions associated with the first and second handheld devices, (2) geo-location information respectively associated with the first and second handheld devices, (3) environmental information respectively associated with the first and second handheld devices, and/or other information associated with the handheld devices. Operation 208 may be performed by a device matching module that is the same as or similar to device matching module 128, in accordance with one or more implementations.

At an operation 210, an action may be triggered within the virtual environment responsive to a positive determination that the first handheld device and the second handheld device were shaken together. Operation 210 may be performed by an environment module that is the same as or similar to environment module 122, in accordance with one or more implementations.

At an operation 212, relationships may be established and/or managed between users and/or user characters within the virtual environment. For example, a relationship between the first avatar associated with the first handheld device and a second avatar associated with the second handheld device may be established in the virtual environment responsive to a positive determination that the first handheld device and the second handheld device were shaken together. Operation 212 may be performed by a relationship module that is the same as or similar to relationship module 128, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to authenticate one or both of a user or a real-world handheld device with respect to a virtual environment based on one or more of shaking patterns, geolocations, or environmental information associated with one or more real-world handheld devices, the system comprising:
   one or more non-transitory computer-readable storage media; and
   one or more processors configured by computer program instructions embodied on the one or more storage media to:
      determine whether a first handheld device and a second handheld device have been shaken together based on one or more of:
         (1) information conveyed by one or more shake signals describing respective shaking motions associated with the first and second handheld devices, a given shake signal associated with a given handled device being provided by a motion detection apparatus disposed within the given handled device, the motion detection apparatus being configured to provide the given shake signal responsive to the given handheld device undergoing a shaking motion caused by a user;
         (2) geo-location information respectively associated with the first and second handheld devices; or
         (3) environmental information respectively associated with the first and second handheld devices; and
      authenticate one or both of the user or the first handheld device with respect to the virtual environment based on information associated with a user-generated shaking motion of individual handheld devices, wherein one or both of the user or the first handheld device is authenticated with respect to the virtual environment responsive to a positive determination that the first handheld device and the second handheld device were shaken together.

2. The system of claim 1, wherein the first handheld device is a toy.

3. The system of claim 1, wherein a form factor of the first handheld device visually represents a first avatar or a first virtual object included in the virtual environment.

4. The system of claim 1, wherein the information associated with the shaking motion of the first handheld device includes a shake pattern configured to be interpreted as a unique first encryption key associated with the first handheld device.

5. The system of claim 1, wherein an action is effectuated in the virtual environment responsive to the authentication.

6. The system of claim 5, wherein the action includes one or both of:
   an interaction in the virtual environment between a first avatar associated with the first handheld device and a second avatar associated with the second handheld device; or
   a first virtual object associated with the first handheld device being obtained in the virtual environment by a second avatar associated with the second handheld device.

7. The system of claim 1, wherein the one or more processors are further configured by the computer program instructions to determine whether the first handheld device and the second handheld device have been shaken together by correlating the information associated with respective user-generated shaking motions associated with the first and second handheld devices.

8. The system of claim 7, wherein the information associated with respective user-generated shaking motions associated with the first and second handheld devices includes a first shake pattern and a second shake pattern each including a range of frequencies, and wherein the shake pattern correlation sub-component is configured to extract frequency bands from the first and second shake patterns that correspond to typical user-generated shaking movements.

9. The system of claim 7, wherein the one or more processors are further configured by the computer program instructions to (1) divide the first and second shake patterns into a plurality of overlapping segments, (2) determine maximum absolute values of a cross-correlation for individual pairs of corresponding segments, and (3) determine a similarity measure between the first and second shake patterns as the mean of the maximum absolute values of the cross-correlation for individual pairs of corresponding segments.

10. The system of claim 1, wherein the one or more processors are further configured by the computer program instructions to determine whether the first handheld device and the second handheld device have been shaken together by correlating the geo-location respectively associated with the first and second handheld devices.

11. The system of claim 1, wherein the one or more processors are further configured by the computer program instructions to determine whether the first handheld device and the second handheld device have been shaken together by correlating the environmental information respectively associated with the first and second handheld devices.

12. The system of claim 11, wherein the information associated with the environment of a given handheld device includes one or more of acoustic information, optical information, or temperature information obtained in the environment of the given handheld device.

13. The system of claim 1, wherein the one or more processors are further configured by the computer program instructions to perform one or both of establishing or managing relationships between one or both of users or user characters within the virtual environment, wherein a relationship between a first avatar associated with the first handheld device and a second avatar associated with the second handheld device is established in the virtual environment responsive to a positive determination that the first handheld device and the second handheld device were shaken together.

14. A computer-implemented method for authenticating one or both of a user or a real-world handheld device with respect to virtual environment based on one or more of shaking patterns, geolocations, or, environmental information associated with real-world handheld devices, the method being implemented in a computer system comprising one or more processors configured to execute computer program instructions, the method comprising:
   determining, using one or more processors, to execute computer program instructions embodied on one or more non-transitory computer-readable storage media, whether a first handheld device and a second handheld device have been shaken together based on one or more of:
      (1) information conveyed by one or more shake signals describing respective shaking motions associated with the first and second handheld devices, a given shake signal associated with a given handled device being provided by a motion detection apparatus disposed within the given handled device, the motion detection apparatus being configured to provide the given shake signal responsive to the given handheld device undergoing a shaking motion caused by a user;

(2) geo-location information respectively associated with the first and second handheld devices; or (3) environmental information respectively associated with the first and second handheld devices; and authenticating, using one or more processors to execute computer program instructions embodied on one or more non-transitory computer-readable storage media, one or both of the user or the first handheld device with respect to the virtual environment based on information associated with a user-generated shaking motion of individual handheld devices, wherein one or both of the user or the first handheld device is authenticated with respect to the virtual environment responsive to a positive determination that the first handheld device and the second handheld device were shaken together.

15. The method of claim 14, wherein an action is effectuated in the virtual environment responsive to the authentication.

16. The method of claim 15, wherein the action includes one or both of:

an interaction in the virtual environment between a first avatar associated with the first handheld device and a second avatar associated with the second handheld device; or a first virtual object associated with the first handheld device being obtained in the virtual environment by a second avatar associated with the second handheld device.

17. The method of claim 14, wherein determining whether the first handheld device and the second handheld device have been shaken together includes extracting frequency bands from a first shake pattern and a second shake pattern that correspond to typical user-generated shaking movements, the first and second shake patterns being descriptive of the respective shaking motions associated with the first and second handheld devices.

18. The method of claim 14, wherein determining whether the first handheld device and the second handheld device have been shaken together includes (1) dividing the first and second shake patterns into a plurality of overlapping segments, (2) determining maximum absolute values of a cross-correlation for individual pairs of corresponding segments, and (3) determining a similarity measure between the first and second shake patterns as the mean of the maximum absolute values of the cross-correlation for individual pairs of corresponding segments.

19. The method of claim 14, wherein the information associated with the environment of a given handheld device includes one or more of acoustic information, optical information, or temperature information obtained in the environment of the given handheld device.

20. The method of claim 14, further comprising one or both of establishing or managing, using one or more processors, relationships between one or both of users or user characters within the virtual environment, wherein a relationship between a first avatar associated with the first handheld device and a second avatar associated with the second handheld device is established in the virtual environment responsive to a positive determination that the first handheld device and the second handheld device were shaken together.

* * * * *